United States Patent [19]

Perego

[11] Patent Number: 6,082,020
[45] Date of Patent: Jul. 4, 2000

[54] SUPPORTING DEVICE FOR DATA-STORAGE OPTICAL DISCS

[75] Inventor: Luciano Perego, Milan, Italy

[73] Assignee: Tapematic U.S.A., Inc., Orlando, Fla.

[21] Appl. No.: 08/996,488

[22] Filed: Dec. 23, 1997

[30] Foreign Application Priority Data

Mar. 12, 1997 [EP] European Pat. Off. .............. 97830112

[51] Int. Cl.[7] .................................................. F26B 13/30
[52] U.S. Cl. ............................................................ 34/92
[58] Field of Search ...................................................... 34/92

[56] References Cited

U.S. PATENT DOCUMENTS

5,177,878   1/1993   Visser ............................................ 34/92

*Primary Examiner*—Henry Bennett
*Assistant Examiner*—Malik N. Drake
*Attorney, Agent, or Firm*—Frommer, Lawrence and Haug LLP

[57] ABSTRACT

A supporting device for data-storage optical discs which includes a rest plate with which at least one supporting element is arranged to receive an optical disc. The supporting device further includes a vacuum assembly and vacuum connecting through-holes for providing vacuum communication between the supporting element and the vacuum assembly. The supporting element includes a base and a side wall arranged to support the optical disc and defining, with the optical disc itself, a vacuum chamber. The vacuum chamber ensures locking retention of the optical disc on the supporting element, while enabling movement of the rest plate, and further achieves cooling of the disc by an air stream passing through the chamber and spreading over the optical disc surface.

32 Claims, 4 Drawing Sheets

SUPPORTING DEVICE FOR DATA-STORAGE OPTICAL DISCS

FIELD OF THE INVENTION

The present invention relates to a supporting device for data-storage optical discs, and more particularly, to a supporting device for data-storage optical discs which includes a rest plate with which at least one supporting element arranged to receive an optical disc includes a vacuum assembly for creating a vacuum, and a connecting member for connecting the supporting element with the vacuum assembly.

In particular, the supporting device of the present invention is designed to conveniently support data-storage optical discs, of the type usually referred to as "compact discs", "DVD", and the like, for example, while the same are being processed in the course of their production cycle.

BACKGROUND OF THE INVENTION

Currently, in the manufacture of optical discs, the retention of the discs during processing is performed typically by supporting devices essentially consisting of a rest plate, usually of circular form, on the upper surface of which supporting elements are mounted with each of the supporting elements being arranged so as to receive an optical disc. These supporting devices further include a suction assembly, generally consisting of a vacuum pump adapted to generate a vacuum region, connected to the individual supporting elements by respective sealed ducts.

In these current supporting devices, several different ducts are required for performing loading and unloading of the optical disc onto and from the supporting elements at different processing stations. As a result thereof, the simultaneous availability both of free optical discs adapted to be picked up from the rest plate and of optical discs firmly fixed to the rest plate for processing is essential.

In order to solve the above problem, a distribution valve has been interposed between the vacuum pump and the different ducts. This distribution valve of such prior supporting devices is used to attempt to ensure effectuation of the above operations as required, which involves considerable planning. Difficulties in planning this distribution device are further increased by the requirement that the rest plate must be capable of rotating, while the suction pump is integral with the supporting device's bearing structure.

For the purpose of promoting a correct positioning of the optical disc, the shape of the supporting elements in the supporting device substantially matches that of the received optical disc.

In addition, a supporting element base is provided with openings that, through the ducts, bring the vacuum region into communication with the optical disc surface turned towards the rest plate. These openings are positioned such that the openings are covered by the optical disc when the optical disc is placed on top of the supporting element. At this time, a pumping action generates a pressure difference between the interior and exterior of the supporting device so that the optical disc is tightly fixed against the supporting element, thereby preventing air from entering the above-mentioned openings.

Typically, the rest plate is rotated to bring the various supporting elements close to the different processing or handling work stations so that displacement of the optical discs out of their fixed seatings during the handling operations of the assembly are avoided.

However, since the securing openings of the optical disc are rather small, generation of a high pressure difference between the interior and exterior of the supporting device is required in order to ensure a sufficient force so as to retain the disc. As a result, suction pumps of relatively high power are necessary and a sealing tightness is to be ensured between the various components and/or ducts in which the vacuum is to be maintained. At the same time, however, the rest plate must be capable of movement.

Consequently, it has been found that the supporting device for optical discs described above has drawbacks associated with its complex structure. In particular, since this device is usually associated with a UV-ray station for drying a lacquer previously coated on the optical disc, it is necessary that a further cooling assembly be provided which is capable of cooling the optical disc during its exposure to radiation to thereby avoid overheating of both the optical disc and the components of the drying station.

To achieve this necessary cooling, the prior supporting device includes a further air pump capable of blowing air through appropriate channel lines placed both inside and outside the rest plate for reaching and thereby cooling the optical disc close to its center and at certain areas of its periphery.

OBJECTS OF THE INVENTION

Therefore, it is an object of the present invention to provide a supporting device for data optical storage discs which avoids the aforementioned disadvantages of the prior art.

An additional object of the present invention is to provide a supporting device for data optical storage discs which ensures retention of the optical discs to the supporting element without generation of a high vacuum.

Another object of the present invention is to provide a supporting device for data optical storage discs which utilizes a less powerful suction pump so that a perfect tightness of the optical disc to the supporting element is no longer a critical factor to achieve proper retention of the optical discs.

A further object of the present invention is to provide a supporting device for data optical storage discs which achieves enhanced cooling of the optical disc by allowing an air stream to substantially cover the entire surface thereof, thereby avoiding building up of undesired localized heat.

Various other objects, advantages and features of the present invention will become readily apparent from the ensuing detailed description and the novel features will be particularly pointed out in the appended claims.

SUMMARY OF THE INVENTION

The foregoing and further objects will become more apparent from the following detailed description and are substantially achieved by a supporting device for data-storage optical discs, wherein in one aspect of the present invention, the supporting device for data-storage optical discs of the present invention includes a rest plate having at least one supporting element which is arranged to receive an optical disc, a vacuum assembly for creating a vacuum region, and a connecting member for providing communication between the supporting element and the vacuum assembly wherein the supporting element includes a base and a side wall arranged to support the optical disc and defining, together with the optical disc, at least one vacuum chamber into which the connecting member opens.

BRIEF DESCRIPTION OF THE DRAWINGS

The following detailed description, given by way of example, will best be understood in conjunction with the accompanying drawings, in which.

DETAILED DESCRIPTION OF CERTAIN PREFERRED EMBODIMENTS

Figure 1:
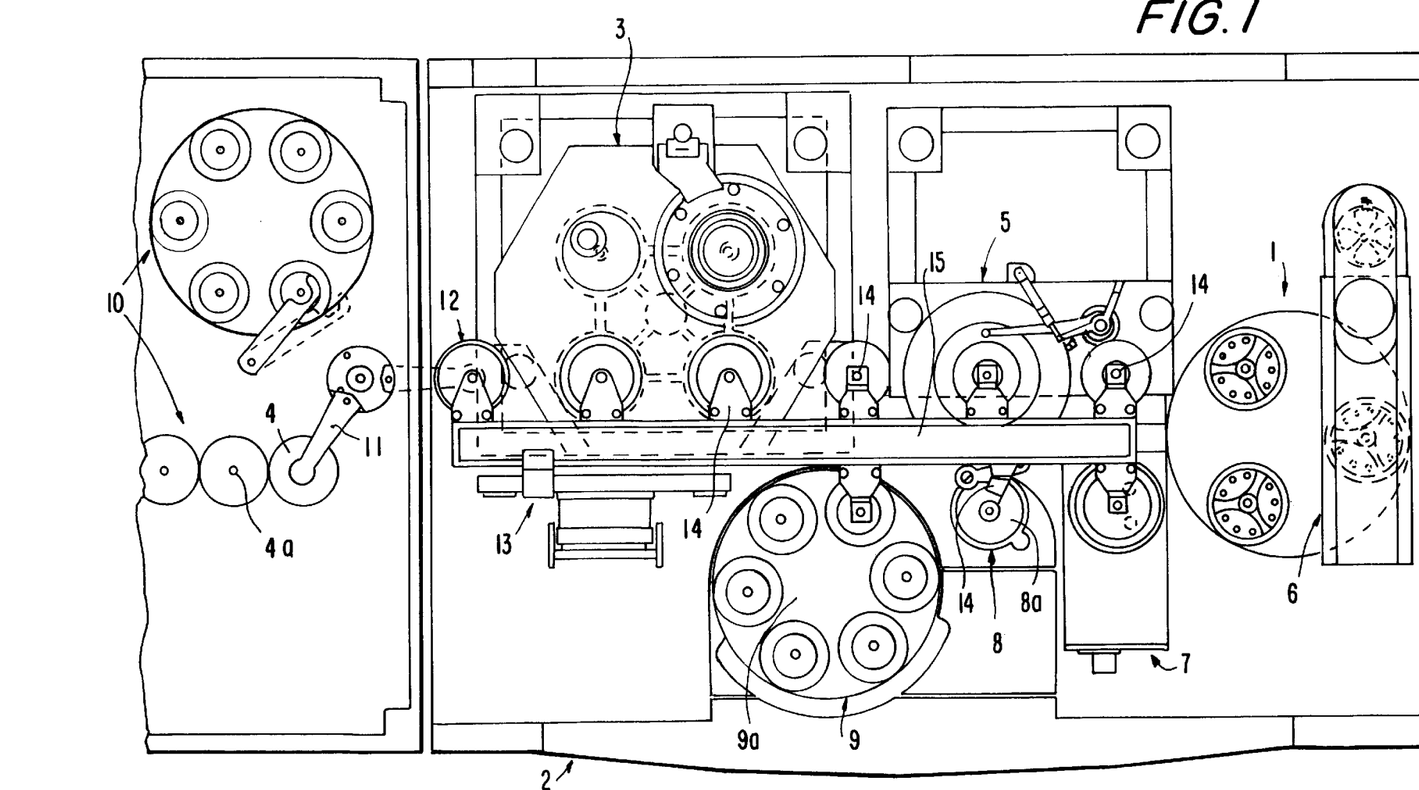
FIG. 1 is a front elevational view in diagrammatic form of an assembly for producing optical discs in which a preferred embodiment of a supporting device in accordance with the teachings of the present invention is used.
Figure 2:
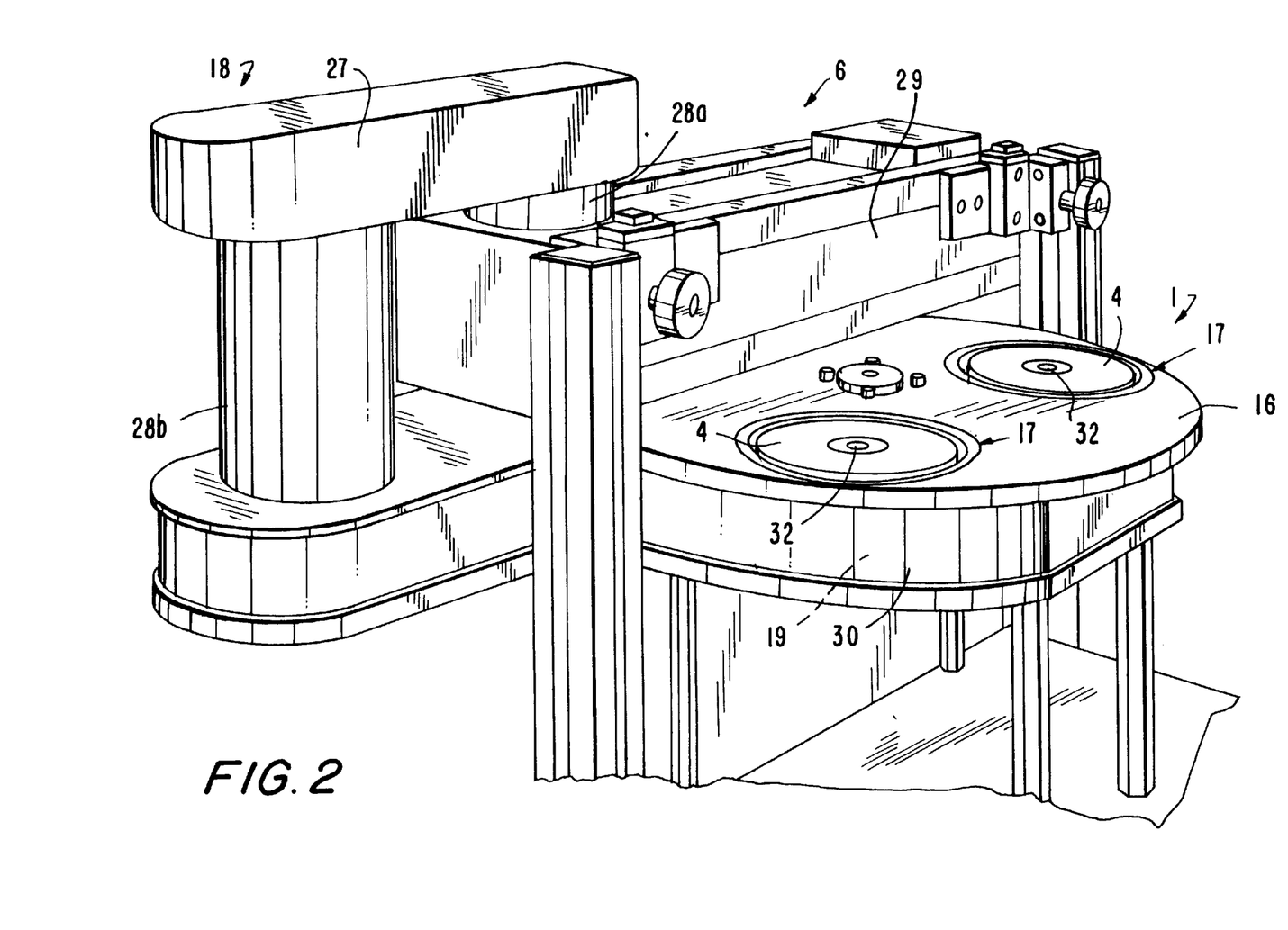
FIG. 2 is a front perspective view of the supporting device illustrated in FIG. 1.

Referring now to the drawings, wherein like reference numerals are used throughout and in particular to FIGS. 1–2, there is illustrated a preferred embodiment of a supporting device for data-storage optical discs in accordance with the teachings of the present invention which has been generally identified by reference numeral 1.

As shown in FIG. 1, this supporting device of the present invention can be incorporated into a system or machine for producing optical discs, generally denoted by 2. In the embodiment shown, this optical disc manufacturing process includes a metallizing station 3 arranged to deposit a reflective metallic layer on one surface of each disc being processed, a lacquering station 5 adapted to deposit a protective lacquer layer on the metallized surface of the optical disc 4, and a drying station 6 wherein a quick drying of the lacquer applied in the lacquering station 5 occurs. The device for manufacturing optical discs 2 further comprises a control station 7 at which a qualitative inspection is performed on the finished disc, a selection station 8 provided with an auxiliary magazine 8a for detecting and collecting possible faulty discs, and an outlet station 9 provided with a collecting magazine 9a or equivalent structure providing means for storing the finished discs 4 in an orderly manner and/or moving the finished discs away from the machine 2.

As is shown in FIG. 1, the optical discs 4 exiting a feeding unit 10 connected with a molding station (not shown) are picked up by a handling device 11 having a rotating arm which thereby individually lays down each optical disc 4 at an inlet post 12. A transferring assembly 13 includes a plurality of pick-up members 14 operatively mounted to an arm 15 longitudinally movable with a reciprocating motion. This transferring assembly 13 performs a sequential transferring of the optical discs 4 being processed between the different work stations 3, 5, 6, 7, 8 and 9. The structure of the transferring device is disclosed in more detail in European patent application Serial No. 97830112.5, filed Mar. 12, 1997, the disclosure of which is hereby incorporated by reference.

In the embodiment shown in FIGS. 1 and 2, the supporting device 1 is arranged to support optical discs 4 discharged from the lacquering station 5 and intended for being submitted to a drying step in the drying station 6, before being transferred to the control station 7.

In accordance with the present invention, the supporting device 1 includes a rest plate 16 with which at least one supporting element 17 is arranged to receive an optical disc 4. More particularly, the rest plate 16 of the supporting device 1 includes a plurality of such circumferentially-distributed supporting elements 17, the number of which can be predetermined depending on the requirements of the supporting device 1.

As shown in FIG. 1, at least one of the supporting elements is subjected to a work station of the optical disc 4. In the supporting device therein illustrated, three supporting elements are provided, one of which is at the drying station 6, whereas the two remaining supporting elements are at a location enabling positioning or removal of the optical discs 4 by the transferring device 13.

In operation, the rest plate 16 is rotated step by step, so that at each step a predetermined supporting element 17 is rotated to a predetermined work or handling station 6.

Figure 3:
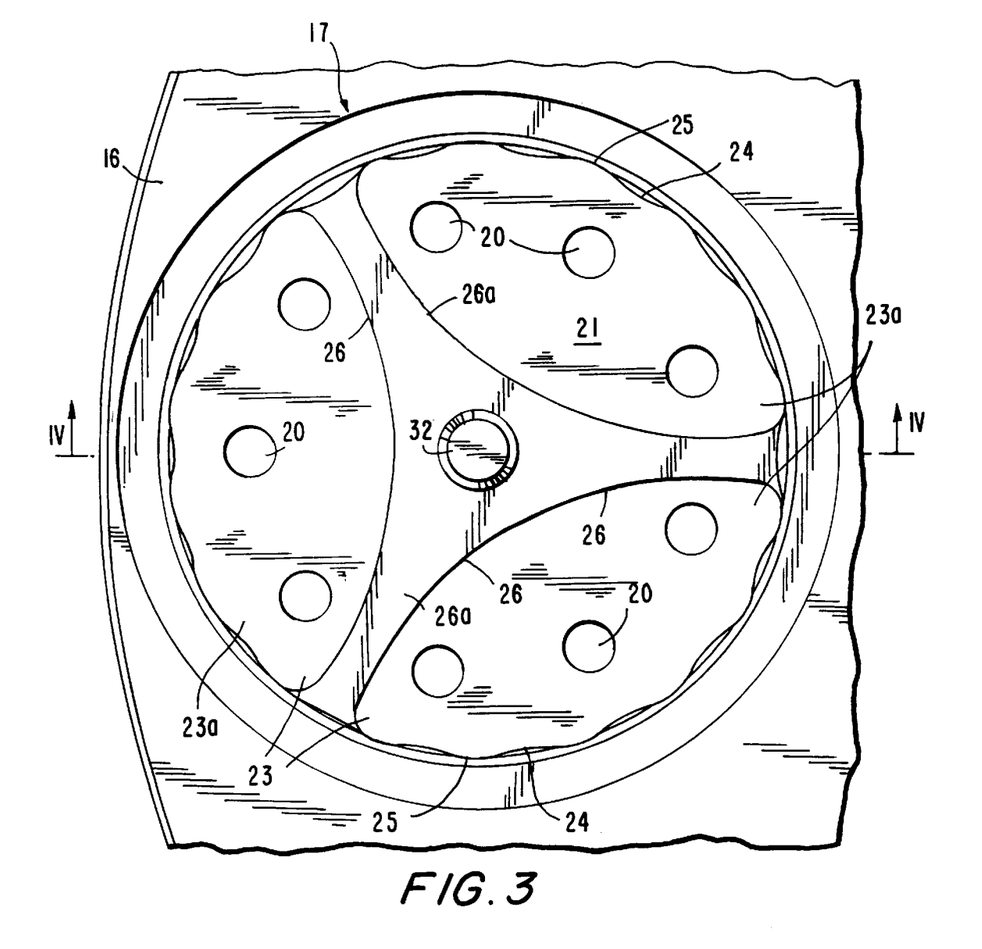
FIG. 3 is an enlarged elevational view specifically illustrating a supporting element of the supporting device illustrated in FIG. 2.
Figure 4:
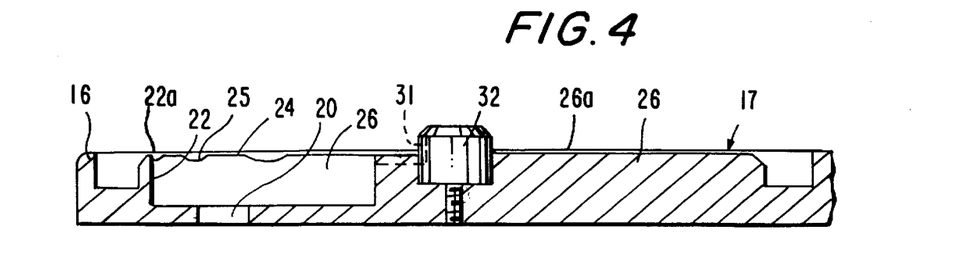
FIG. 4 is a side sectional view of the supporting element of FIG. 3 taken along line IV—IV in FIG. 3.
Figure 5:
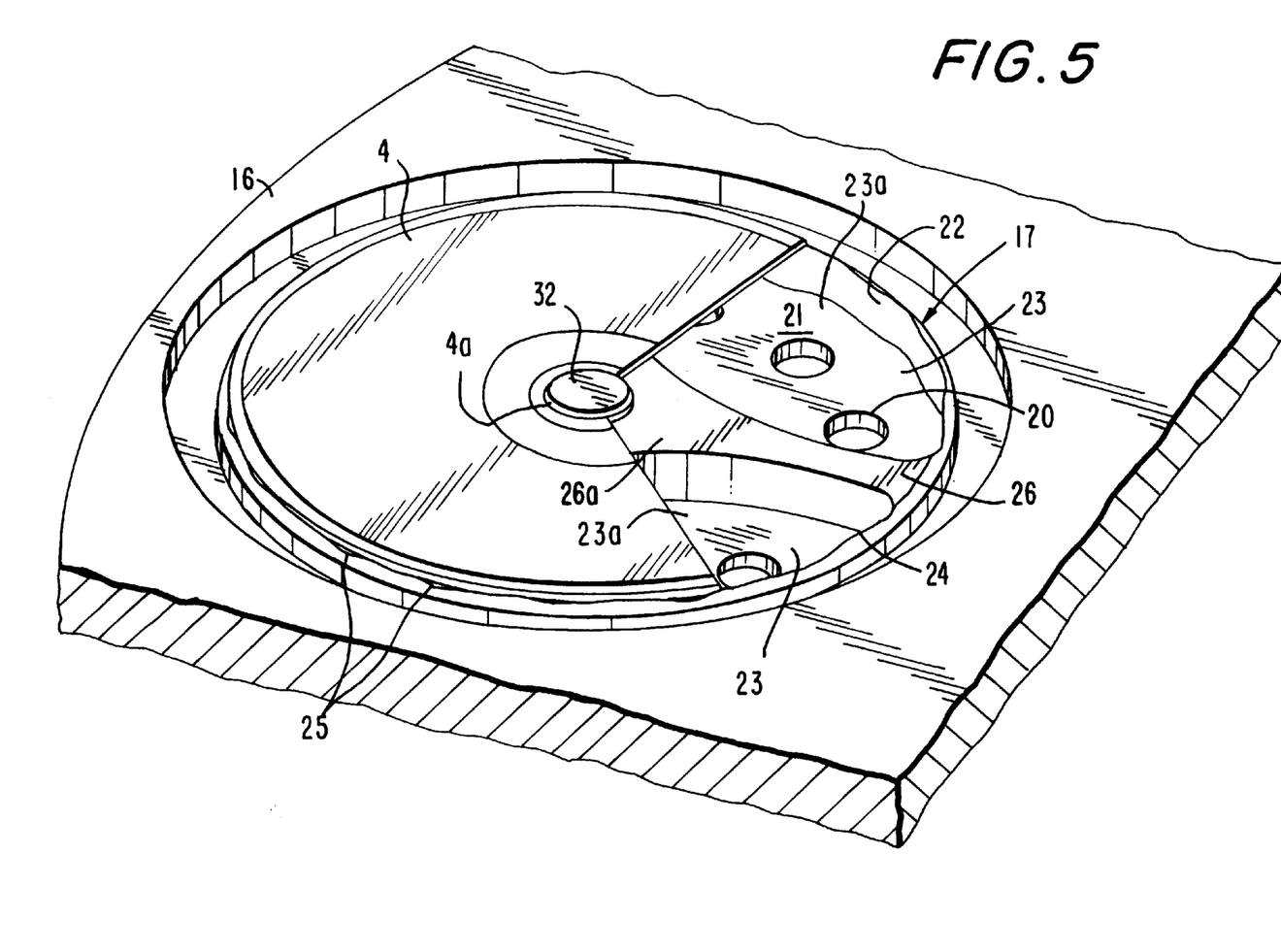
FIG. 5 is a partly broken away front perspective view specifically illustrating an optical disc being laid on the supporting element of FIGS. 3 and 4.

The supporting device 1 of the present invention further includes a vacuum generation system 18 for creating a vacuum region 19, and a connecting member 20 to bring each supporting element 17 into communication with the vacuum generation system 18 (see FIGS. 3–5).

In addition, each supporting element 17 includes a base 21 and a side wall 22 arranged to support the optical disc 4 which defines with the optical disc itself, at least one vacuum chamber 23, into which the connecting member 2 opens.

As best shown in FIGS. 3–5, the side wall 22 is provided, at the upper part thereof, with bearing portions 24 arranged to support the optical disc 4 and openings 25 enabling passage of an air stream from the exterior of the device to the vacuum chamber 23. These bearing portions 24 and openings 25 are evenly distributed and are defined in an alternate sequence by an edge of an undulated profile 22a of the side wall 22 (see FIG. 4).

Due to the suction effect produced by the vacuum assembly 18, the bearing portions 24 and openings 25 create a cooling air stream from the optical disc periphery to the center thereof, so that the entire lower surface of the disc is cooled. At least one web member extending from the side wall 22 to the center of the supporting element 17 is provided for attempting to reduce the chamber volume. In the particular embodiment herein shown, three of such web members 26 are illustrated with each of these web members 26 extending from the supporting element 17 center to the side wall 22 and spaced apart from each other by the same angle of 120° so as to divide the vacuum chamber 23 into as many portions 23a as the web members (see FIG. 3). These web members 26 have a substantially flat upper surface 26a so that a surface of the optical disc 4 can be laid thereon, thereby preventing the disc from undergoing an excessive deformation due to the vacuum existing in chamber 23.

The vacuum system 18 includes a suction pump (not shown) connected by an air-tight pipeline to a manifold 27 from which two suction ducts 28a, 28b depart. A first duct 28a is intended for cooling of a drying unit 29 of the drying station 6. The drying unit, in a manner known per se, performs drying of a lacquer previously deposited on the disc 4 by UV radiation. The second suction duct 28b in turn communicates with a vacuum pre-chamber 30, defining the vacuum region 19 at the interior thereof. This vacuum pre-chamber 30 is formed adjacent to the rest plate 16 on the opposite side relative to the supporting elements 17, so that part of the vacuum pre-chamber 30 is defined by the rest plate itself. As shown in FIG. 2, the vacuum pre-chamber 30 and rest plate 16 substantially have the same radial overall dimensions. As a result thereof, a direct connection is obtained between the area under vacuum 19 and each of the supporting elements 17, through the connecting member 20 arranged inside each of the supporting elements. Accordingly, no particular channel lines and/or the interposition of distribution valve devices, as necessary in the known art, are required to accomplish this purpose.

Advantageously, the previously-mentioned connecting member 20 includes through-holes disposed in the base 21 of each supporting element 17 and spaced apart the same angular distance from each other along a circumference the center of which is on the axis of the supporting element. In the embodiment herein shown in FIG. 3, there are nine through-holes 20 with three through-holes in each portion 23a of the vacuum chamber 23. In summary, the through-holes 20 define respective connecting channels extending from the vacuum chamber 23 to the supporting element 17, through base 21, to generate flow resistance in the air stream and therefore retain a vacuum in vacuum pre-chamber 30 even when one or more optical discs 4 are removed from the supporting element 17. In practice, at the moment the optical disc 4 is removed from its seating in the supporting element 17, immediately the atmospheric pressure is restored in chamber 23 and the air stream passing through the through-holes 20 toward the vacuum area 19 defined in the vacuum pre-chamber 30 is increased.

Due to the size of the through-holes 20 or equivalent connecting channels, only an air flow rate of low value is enabled to enter pre-chamber 30, so that the latter is maintained under a vacuum even in the absence of one or more discs 4 from the respective supporting elements 17.

Each supporting element 17 also has a centering member 32 for the optical disc 4 to place the disc to a predetermined position on the supporting element. As best shown in FIG. 4, this centering member includes a pin 32 of the type usually employed for positioning of compact discs, located in registration with an opening 4a in the optical disc 4 for mating therewith and preventing relative slidings between the disc and the supporting element 17.

At the center of the optical disc 4, the supporting element 17 may be provided with an optional air access 31 (shown in broken line in FIG. 4) for providing a cooling air stream from the center to the periphery of the optical disc.

Based upon the foregoing and in accordance with the general objects of the present invention, the present invention achieves several important advantages. First, the device in accordance with the invention is capable of ensuring locking retention of the optical discs to the supporting elements so that the pressure difference generated between the external environment and the vacuum area 19 is much lower than in prior supporting devices for optical discs.

In fact, a sufficient retention force of the optical discs 4 to the respective supporting elements 17 can be achieved even if a relatively weak vacuum is created within the vacuum chamber 19, because the present invention enables the overall surface area over which the vacuum is applied on each optical disc to be greatly increased as compared with the known art. Actually, since the optical disc is supported by means of the bearing portions 24 of the side wall 22, the vacuum achieved within the vacuum chamber 23 acts on most of the lower surface of the optical disc.

The achieved result enables a suction pump of lower power to be employed, that possibly may consist of a mere vacuum ventilation unit, which will in turn lead to a reduction in the production and servicing costs of the device.

In addition, the presence of a vacuum chamber 23 for each supporting element 17, connected with the vacuum region 19 by the gauged through-holes 20 permits one or more optical discs 4 to be removed from the supporting element without substantially reducing the vacuum in the vacuum pre-chamber 30 and consequently ensuring retention of the remaining optical discs 4 as well.

As a result of the foregoing, at the moment a new optical disc is placed on an empty supporting element 17, creation of a vacuum for obtaining securement of same is required in the chamber of the supporting element alone. Therefore, the operating time on each optical disc is significantly reduced.

This time is further reduced due to the volume taken up by air in chamber 23 is reduced by the presence of the web members 26. Another important advantage of the invention is represented by the possibility of efficiently cooling the optical disc.

In fact, in the present invention, an air stream is allowed to enter the vacuum chamber 23 through openings 25 located at the outer edge of the optical disc 4, so that towards the center of the optical disc a fluid stream is generated which is capable of spreading over the lower surface of same, thereby removing heat therefrom.

In addition, cooling is further increased by enabling the air directed to chamber 23 to pass by the center of the optical disc as well, through passages 32. Moreover, the efficient removal of heat from the disc after the drying step allows achievement of an optimal stabilization of the correct lacquer on the optical disc.

The advantages thus obtained in an automatic production process are of great importance in that the production rate can be optionally increased or in any case the number of faulty optical discs that are to be discarded 20 as a result of an excessive heat accumulation is reduced.

While the present invention has been particularly shown and described with reference to certain preferred embodiments, it will be readily apparent to those of ordinary skill in the art that various changes and modifications may be made therein without departing from the spirit and scope of the invention. It is intended that the appended claims be interpreted as including the foregoing as well as various other such changes and modifications.

What is claimed is:

1. A supporting device for data-storage optical disc comprising:

a rest plate with which at least one supporting element is arranged to receive an optical disc;

vacuum means for creating a vacuum region;

vacuum connection means for communicating the vacuum generated by said vacuum means to said supporting element;

said supporting element further comprising a base and a side wall arranged to support the optical disc and defining, together with said optical disc, at least one vacuum chamber communicating with said vacuum connecting means wherein said side wall includes means for enabling passage of an air stream to the vacuum chamber.

2. The supporting device for data-storage optical discs of claim 1, wherein said means for enabling passage of an air stream to the vacuum chamber includes bearing portions arranged to support the optical disc and vacuum through-holes provided in the side wall.

3. The supporting device for data-storage optical discs of claim 2, wherein the bearing portions and vacuum through-holes are evenly distributed along the side wall of the supporting element.

4. The supporting device for data-storage optical discs of claim 2, wherein said bearing portions and vacuum through-holes are defined by an edge of an undulated profile provided in the side wall.

5. The supporting device for data-storage optical discs of claim 2, wherein said bearing portions and vacuum through-holes provide a cooling air stream from the periphery to the center of the optical disc with the air stream therefore extending over the entirety of the lower surface of the optical disc.

6. The supporting device for data-storage optical discs of claim 1, wherein said supporting element further comprises at least one web member for reducing the vacuum chamber volume.

7. The supporting device for data-storage optical discs of claim 6, characterized in that said web member extends from the center of the supporting element to the side wall thereof.

8. The supporting device for data-storage optical discs of claim 6, wherein said web member has a substantially flat upper surface to provide a mating support surface for the surface of the optical disc.

9. The supporting device for data-storage optical discs of claim 1, wherein said vacuum means includes a vacuum pre-chamber having a wall defined by said rest plate, said vacuum pre-chamber being located at an opposed relation to said supporting element.

10. The supporting device for data-storage optical discs of claim 9, wherein said vacuum connecting means comprises a predetermined number of connecting channels extending from the vacuum pre-chamber to the supporting element.

11. The supporting device for data-storage optical discs of claim 10, wherein said connecting channels pass through the base of the supporting element thereby generating a flow resistance in the air stream in order to retain a vacuum in the vacuum pre-chamber when the optical disc is removed from the supporting element.

12. The supporting device for data-storage optical discs of claim 1, wherein the supporting element further comprises centering means for centering the optical disc at a predetermined position on the supporting element.

13. The supporting device for data-storage optical discs of claim 12, wherein said centering means comprises a pin in registration with a central opening in said optical disc for mating therewith.

14. The supporting device for data-storage optical discs of claim 1, wherein the supporting element provides an air access at the center of the optical disc to provide a cooling air stream from the center to the periphery of the optical disc.

15. The supporting device for data-storage optical discs of claim 1, wherein associated with the rest plate are a predetermined number of supporting elements disposed circumferentially on the rest plate.

16. The supporting device for data-storage optical discs according to claim 15, wherein a work station of the optical disc is associated with at least one supporting element.

17. The supporting device for data-storage optical discs of claim 16, wherein one of said work stations is a UV-ray drying station for a lacquer previously coated on the optical disc.

18. A supporting device for data-storage optical disc comprising:
   a rest plate with which at least one supporting element is arranged to receive an optical disc;
   vacuum means for creating a vacuum region;
   vacuum connection means for communicating the vacuum generated by said vacuum means to said supporting element;
   said supporting element further comprising a base and a side wall arranged to support the optical disc and defining, together with said optical disc, at least one vacuum chamber communicating with said vacuum connecting means, and wherein the side wall includes bearing portions arranged to support the optical disc and vacuum through-holes to enable passage of an air stream to the vacuum chamber.

19. The supporting device for data-storage optical discs of claim 18, wherein the bearing portions and vacuum through-holes are evenly distributed along the side wall of the supporting element.

20. The supporting device for data-storage optical discs of claim 18, wherein said bearing portions and vacuum through-holes are defined by an edge of an undulated profile provided in the side wall.

21. The supporting device for data-storage optical discs of claim 18, wherein said bearing portions and vacuum through-holes provide a cooling air stream from the periphery to the center of the optical disc with the air stream therefore extending over the entirety of the lower surface of the optical disc.

22. A supporting device for data-storage optical disc comprising:
   a rest plate with which at least one supporting element is arranged to receive an optical disc;
   vacuum means for creating a vacuum region;
   vacuum connection means for communicating the vacuum generated by said vacuum means to said supporting element;
   said supporting element further comprising a base and a side wall arranged to support the optical disc and defining, together with said optical disc, at least one vacuum chamber communicating with said vacuum connecting means, said supporting element further comprising at least one web member for reducing the vacuum chamber volume.

23. The supporting device for data-storage optical discs of claim 22, wherein said web member extends from the center of the supporting element to the side wall thereof.

24. The supporting device for data-storage optical discs of claim 22, wherein said web member has a substantially flat upper surface to provide a mating support surface for the surface of the optical disc.

25. A supporting device for data-storage optical disc comprising:
   a rest plate with which at least one supporting element is arranged to receive an optical disc;
   vacuum means for creating a vacuum region;
   vacuum connection means for communicating the vacuum generated by said vacuum means to said supporting element;
   said supporting element further comprising a base and a side wall arranged to support the optical disc and defining, together with said optical disc, at least one vacuum chamber communicating with said vacuum connecting means; and
   wherein said vacuum means includes a vacuum pre-chamber having a wall defined by said rest plate, said vacuum pre-chamber being located at an opposed relation to said supporting element plate.

26. The supporting device for data-storage optical discs of claim 25, wherein said vacuum connecting means comprises a predetermined number of connecting channels extending from the vacuum pre-chamber to the supporting element.

27. The supporting device for data-storage optical discs of claim 26, wherein said connecting channels pass through the base of the supporting element thereby generating a flow resistance in the air stream in order to retain a vacuum in the vacuum pre-chamber when the optical disc is removed from the supporting element.

28. A supporting device for data-storage optical disc comprising:

a rest plate with which at least one supporting element is arranged to receive an optical disc;

vacuum means for creating a vacuum region;

vacuum connection means for communicating the vacuum generated by said vacuum means to said supporting element;

said supporting element further comprising a base and a side wall arranged to support the optical disc and defining, together with said optical disc, at least one vacuum chamber communicating with said vacuum connecting means, wherein the supporting element further comprises centering means for centering the optical disc at a predetermined position on the supporting element which comprises a pin in registration with a central opening in said optical disc for mating therewith.

29. A supporting device for data-storage optical disc comprising:

a rest plate with which at least one supporting element is arranged to receive an optical disc;

vacuum means for creating a vacuum region;

vacuum connection means for communicating the vacuum generated by said vacuum means to said supporting element;

said supporting element further comprising a base and a side wall arranged to support the optical disc and defining, together with said optical disc, at least one vacuum chamber communicating with said vacuum connecting means, wherein the supporting element provides an air access at the center of the optical disc to provide a cooling air stream from the center to the periphery of the optical disc.

30. A supporting device for data-storage optical disc comprising:

a rest plate with which at least one supporting element is arranged to receive an optical disc;

vacuum means for creating a vacuum region;

vacuum connection means for communicating the vacuum generated by said vacuum means to said supporting element;

said supporting element further comprising a base and a side wall arranged to support the optical disc and defining, together with said optical disc, at least one vacuum chamber communicating with said vacuum connecting means, wherein associated with the rest plate are a predetermined number of supporting elements disposed circumferentially on the rest plate.

31. The supporting device for data-storage optical discs according to claim 30, wherein a work station of the optical disc is associated with at least one supporting element.

32. The supporting device for data-storage optical discs of claim 31, wherein one of said work stations is a UV-ray drying station for a lacquer previously coated on the optical disc.

* * * * *

UNITED STATES PATENT AND TRADEMARK OFFICE
CERTIFICATE OF CORRECTION

PATENT NO. : 6,082,020

DATED : July 4, 2000

INVENTOR(s) : Luciano Perego

It is certified that errors appear in the above-identified patent and that said Letters Patent is hereby corrected as shown below:

On the cover page of the patent at line item [30] (Foreign Application Priority Data) change "97830112" to --97830112.5--.

Signed and Sealed this

Third Day of April, 2001

Attest:

NICHOLAS P. GODICI

Attesting Officer     *Acting Director of the United States Patent and Trademark Office*